Oct. 16, 1956  W. E. KERR  2,767,269
SELF-POSITIONING LIMIT SWITCH FOR DRAWBENCHES
Filed Aug. 12, 1953
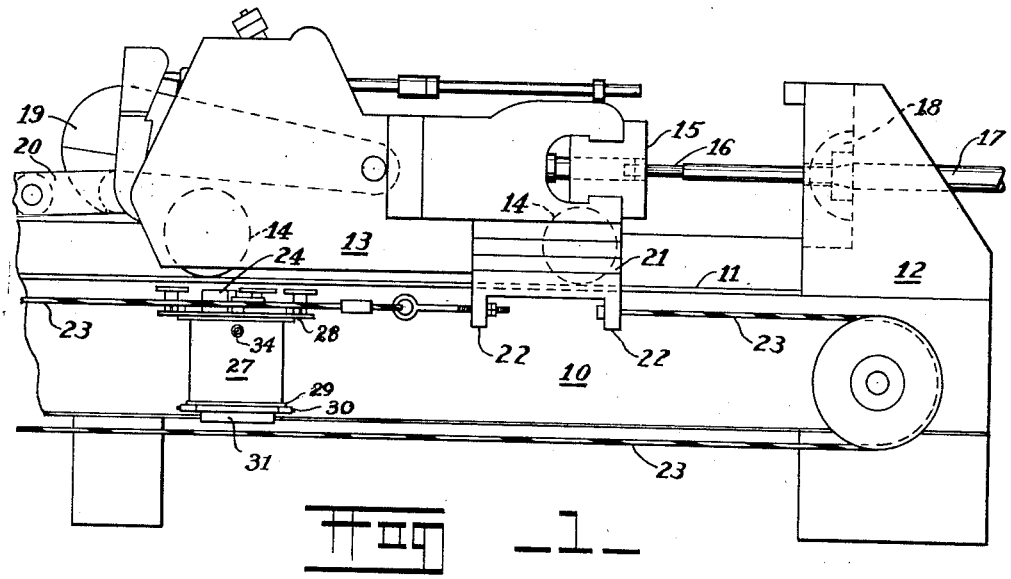
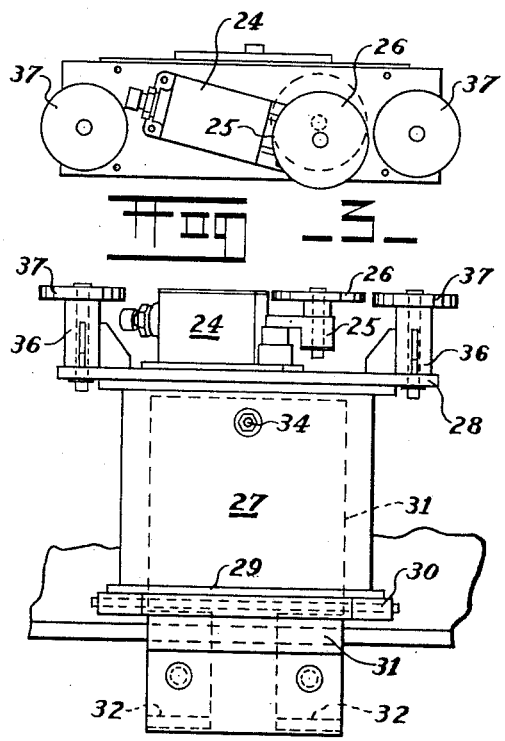
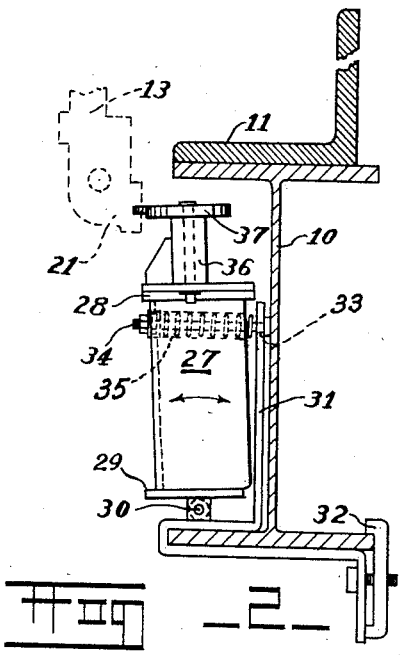
INVENTOR.
Wallace E. Kerr
BY 
ATTORNEY United States Patent Office 2,767,269
Patented Oct. 16, 1956

2,767,269

SELF-POSITIONING LIMIT SWITCH FOR DRAWBENCHES

Wallace E. Kerr, Poland, Ohio

Application August 12, 1953, Serial No. 373,857

7 Claims. (Cl. 200—61.41)

This invention relates to drawbenches of the kind in which lengths of metal sections are drawn through restricting or forming dies for the purpose of reducing or forming the cross sectional area or shape of the metal sections.

More particularly the invention relates to a limit switch for use in connection with such drawbenches for controlling the apparatus thereof acting to move the grip bit carriage of the drawbench.

The principal object of the invention is the provision of a self-positioning limit switch for a drawbench and self-positioning with respect to a portion of the grip bit carriage of the drawbench.

A further object of the invention is the provision of a limit switch mounting for a drawbench enabling the limit switch to be moved by the mounting upon being engaged by the grip bit carriage of a drawbench to uniformly position the limit switch for actuation by the grip bit carriage.

A still further object of the invention is the provision of means for mounting a self-positioning limit switch on a drawbench to permit the same to be movable transversely with respect to the drawbench.

A still further object of the invention is the provision of a limit switch for a drawbench or similar device, said limit switch incorporating rotatable elements acting as guides with respect to movable switch elements.

A still further object of the invention is the provision of a movable mounting for a limit switch as applied to a drawbench to enable said limit switch and mounting to be positioned relative to said drawbench by the grip bit carriage moving along said drawbench so that the limit switch may be uniformly actuated by said grip bit carriage regardless of the irregularities in the drawbench and specifically the parallel tracks on which the grip bit carriage travels as well as such irregularities as may exist in the grip bit carriage and its limit switch engaging portions.

Those skilled in the art relating to drawbenches will recognize that a plurality of limit switches are normally employed in connection therewith and are positioned along the length of the drawbench for controlling the actuating mechanism of the grip bit carriage of the drawbench such as, for example, in controlling the return of the grip bit carriage to a position adjacent the die stand of the drawbench.

It is a recognized object in the operation of drawbenches that the grip bit carriage be returned rapidly to the die stand so that a subsequent drawing operation may be performed with a minimum loss of time and so that the pointing of the workpieces may be of minimum length and yet engageable by the grip bits of the grip bit carriage in position adjacent the die stand. The position of the grip bit carriage with respect to the die stand, as upon the return thereof following a drawing operation, is controlled by one or more limit switches on the drawbench and it has frequently been found that due to irregularities in the shape, wear, tolerances or construction of the drawbench, the grip bit carriage and particularly its depending portion normally engaging the limit switch misses the same with the result that the energizing apparatus is not suitably controlled and the grip bit carriage strikes the die stand with the likelihood of damage or, alternately, stops short thereof, both of which actions are time consuming and often result in damaging the equipment.

The present invention seeks to eliminate such inaccurate registry between the depending portion of the grip bit carriage and the limit switches along the drawbench and thereby insure the accurate and desirable control of the grip bit carriage at all times in all positions on said drawbench.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a side elevation of a portion of a drawbench illustrating the die stand thereof and a grip bit carriage on said drawbench adjacent said stand and a limit switch positioned on said drawbench.

Figure 2 is an enlarged cross sectional elevation of a portion of the drawbench shown in Figure 1.

Figure 3 is a top plan view of a limit switch and mounting therefor.

Figure 4 is a side view of the limit switch and mounting therefor shown in Figure 3.

By referring to the drawings and Figure 1 in particular it will be seen that a drawbench to which the various features of my invention may be applied comprises a bench 10 having a pair of spaced parallel tracks 11 and terminating at one end in a die stand 12. A grip bit carriage, generally indicated by the numeral 13, includes wheels 14 which travel along the spaced parallel tracks 11 of the drawbench as known in the art.

The grip bit carriage 13 includes grip bit assemblies generally indicated by the numeral 15 for engagement with the pointed ends 16 of workpieces 17 which have been positioned through dies 18 in the die stand 12. The grip bit carriage 13 includes a hook 19 adapted to be engaged in an actuating chain 20 for moving the grip bit carriage along the parallel tracks 11 of the drawbench in a drawing operation and the grip bit carriage 13 includes a depending portion 21, parts 22—22 of which are secured to a flexible cable 23 which runs along the side of the drawbench 10 and serves as a means of returning the grip bit carriage 13 to a position adjacent the die stand 12 after the completion of a drawing operation. The depending portion 21 of the grip bit carriage 13 is elongated and forms a plane parallel with respect to the drawbench 10, which plane acts as means for engaging and actuating one or more limit switches positioned along the drawbench 10, as hereinbefore described, and one of which is illustrated in Figure 1 and generally indicated by the numeral 24.

The limit switch 24, as best seen in Figures 3 and 4 of the drawings, includes an operating arm 25 with a rotatable element 26 on the free end thereof biased toward and adapted to engage the elongated plane of the depending portion 21 of the grip bit carriage 13 so as to make or break an electrical circuit controlled by the limit switch 24.

The operating arm 25 of the limit switch 24 permits movement of the same and the rotatable element 26 thereon a relatively small distance suitable for actuating the limit switch 24 at such time as it is engaged by the depending portion 21 of the grip bit carriage 13. In order that such actuation will always occur, the entire limit switch 24 is positioned on a mount comprising a stand 27 including a rectangular top portion 28 and bottom portion 29 carrying a hinge 30. The hinge 30 may be mounted directly on the drawbench 10 or indirectly thereon as illustrated and described herein and wherein a mounting bracket 31 is positioned on the drawbench 10 and fastened thereto as by clamping pieces 32.

The mounting bracket 31 includes a vertical section extending upwardly along the side of the drawbench 10 and includes an aperture 33 in which a rod 34 is mounted so that it extends outwardly with respect to the drawbench and passes through an aperture in the stand 27. A coil spring 35 is positioned over the rod 34 and against the inner side of the stand 27 and normally urges the same outwardly with respect to the drawbench 10 and the mounting bracket 31 and on an arc based on the hinge 30.

By referring to Figure 2 of the drawings it will be observed that in normal position the stand 27 is thus held in outwardly inclined relation with respect to the mounting bracket 31 and the drawbench 10 so that the upper portion thereof is spaced further away from the drawbench 10 than the lower portion thereof but is movable inwardly against the drawbench and the mounting bracket 31 by compression of the coil spring 35.

The top portion 28 of the stand 27 extends longitudinally beyond the limit switch 24 and its operating arm 25 and includes a pair of brackets 36—36, one positioned on each end of the top 28, and each of which carries a rotatable element 37 on its uppermost end. The diameter of the rotatable elements 37 are comparable with the diameter of the rotatable element 26 on the operating arm 25 of the limit switch 24 and are positioned by the brackets 36—36 so that they lie inwardly from the outermost position of the rotatable element 26 on the operating arm 25. In such position they engage the depending portion 21 of the grip bit carriage 13 and thereby position the stand 27 and hence the limit switch 24 in proper alignment with the depending portion 21 of the grip bit carriage 13 and thus insure its actuation thereby.

It will thus be seen that when the grip bit carriage 13 approaches the limit switch 24, it will first engage one of the rotating elements 37 of the stand 27 and thereby move the stand 27 and hence the limit switch 24 into alignment with the rotatable element 26 on the operating arm 25 of the limit switch 24 and maintain it in such position before, during and after the rotatable element 26 has engaged the depending portion 21 and actuated the limit switch 24. It will thus be seen that a desirable sequence of actions will occur regardless of the relative position of the grip bit carriage 13 with respect to the parallel tracks 11 of the drawbench as the outermost position of the stand 27 is such that it will always be engaged by the depending portion 21 of the grip bit carriage 13 while its innermost position with the coil spring 35 partially compressed is such that the operating elements of the limit switch 24 are accurately presented to the depending portion 21 of the grip bit carriage for actuation thereby.

It will occur to those skilled in the art that the self-positioning limit switch mounting disclosed herein may be applicable to machines similar to the drawbench as herein utilized as an example, and that the relative positioning of the movable parts may be reversed.

It will thus be seen that the several objects of the invention are met by the self-positioning limit switch mounting disclosed herein.

Having thus described my invention, what I claim is:

1. A self-positioning limit switch assembly for a machine having an element movable therealong, said element having a depending portion of finite length for engaging said limit switch assembly, said limit switch assembly comprising electrical switch means including a movable operating arm having a rotatable element thereon and said limit switch assembly including a member having guide elements disposed on either side of said limit switch operating arm, said guide elements including rotatable members thereon, said limit switch assembly including a pivot securing the same to said machine for transverse arcuate movement with respect to said machine and means normally urging said limit switch assembly outwardly from said machine and into the path of said depending portion of the grip bit carriage.

2. In a machine having an elongated trackway with an element longitudinally movable therealong and having a depending actuator of finite length, means to move said element along said trackway whereby said actuator is moved along a designated pathway; a limit switch for controlling electrical circuits and having a depressible operator for manipulating said switch, said operator being resiliently biased toward said actuator, and being mounted normally in a designated position with respect to the longitudinal extent of said trackway and so said operator projects a precise extent in excess of a desirable extent into said pathway; a support member affixed to said switch, spaced a longitudinal distance on either side of said operator not exceeding the finite length of said actuator and projecting the said desirable extent into the said pathway; a resilient biasing means effecting the projection of said support member into the said pathway and with respect to said actuator and support member, resiliently urging one toward the other; thereby in the movement of the said element along the said trackway, said actuator and support member will displace said operator the said desirable extent so said operator thereupon projects into said pathway said precise extent and thereupon continued movement of said element will displace said operator out of said pathway the said precise extent.

3. A switch mounting comprising a displaceable stand affording simultaneous, identical, and equal displacement to a first element mounted thereon and to a second element spaced therefrom and similarly mounted thereon; a switch also mounted on the said stand, intermediate said first and second elements, and having an operating arm with a third element being biased outwardly and extending outwardly of a rectilinear line defining the outer periphery of said first and second elements and all the foregoing assembly biased outwardly; a portion for transition along successively said first, third, and second elements parallel to and inwardly of said line contrived to so displace said first element inwardly and consequent to the common mounting on said stand, simultaneously displacing said second element an equal extent and thereafter displacing said third element to the said line, thereafter releasing the third element, meanwhile maintaining said first and second elements depressed equal extent and thereafter releasing the biased assembly.

4. The structure of claim 3 wherein the displacement of said first and second elements is duplicate with respect to the said portion for transition of said portion in initial direction and in reverse direction.

5. In a machine comprising an elongated trackway, a carriage longitudinally movable therealong and having a depending portion of finite length, means to move said carriage along said trackway and thereby said portion is moved along a defined pathway; a switch for controlling electrical circuits and having an operator protruding into said pathway, the said switch being affixed to a stand having a pivotal mounting on said machine, the axis of said pivotal mounting being disposed parallel with said pathway and whereon said stand pivots for lateral displacement with respect to said pathway; a first element protruding into said pathway and affixed to said stand and spaced a longitudinal distance before said operator and a second element protruding equally into said pathway and likewise affixed to said stand and spaced a longitudinal distance beyond said operator, the aggregate longitudinal spacing of said elements not exceeding said finite length and the effective radius of said first and second elements being respectively equal, whereby the pivoting movement of the said elements is simultaneous, identical, and equal when depressed out of said pathway when said portion moves along the defined pathway.

6. In a machine comprising an elongated trackway, a carriage longitudinally movable therealong and having a depending portion of finite length, means to move said carriage along said trackway and thereby said portion is moved along a defined pathway; a first element protruding into said pathway and affixed, as to position, relative to a stand; a second element longitudinally spaced from said first element a distance not exceeding said finite length and likewise protruding into the said pathway and likewise affixed to said stand; a switch for controlling electrical circuits affixed to the said stand intermediate the said first and second elements, which switch also provides an operator protruding into said pathway and the said stand, with its affixed switch and elements, is secured to the machine in a manner providing for parallel lateral movement with respect to said pathway, the organization being such that the transition of said portion into contact with said first element will move said first element laterally out of said pathway and thereby simultaneously induce a duplicate lateral movement of said second element.

7. The structure of claim 6 wherein the lateral displacement of said first and second elements is duplicated, with respect to said portion by transition of the said portion in initial direction and in reverse direction.

References Cited in the file of this patent

UNITED STATES PATENTS

| | | |
|---|---|---|
| 1,078,815 | Wiegand | Nov. 18, 1913 |
| 2,089,936 | Ahlburg | Aug. 17, 1937 |
| 2,337,813 | Grossenbacher | Dec. 28, 1943 |
| 2,399,113 | Guenther | Apr. 23, 1946 |
| 2,404,234 | Kerr | July 16, 1946 |
| 2,573,139 | Hoffman | Oct. 30, 1951 |